Patented Oct. 28, 1941

2,260,556

UNITED STATES PATENT OFFICE 2,260,556

CONDENSATION PRODUCTS OF ACYLATED METHYLOL PHENOLS AND RESIN ACIDS

Herman A. Bruson, Philadelphia, Pa., assignor to The Resinous Products & Chemical Company, Philadelphia, Pa.

No Drawing. Application May 9, 1940, Serial No. 334,172

29 Claims. (Cl. 260—103)

This invention relates to condensation products obtained by heating an esterified phenol having at least one acyloxymethyl group attached to the aromatic nucleus and a natural resin acid or an ester of a resin acid. It also relates to a process for preparing these condensation products.

In copending application, Serial No. 272,804 filed May 10, 1939, it is shown that tertiary aminomethyl phenols, obtained by condensing a phenol, formaldehyde and a secondary amine, are converted to acyloxymethyl phenol esters by heating them with the anhydride of a carboxylic acid. One example of this type of esterified phenol is 2,4,6-tris-(acetoxymethyl)-phenyl acetate having the formula—

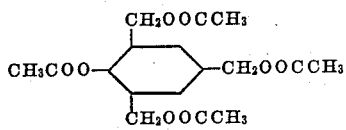

It has now been found that when these phenol esters having an acyloxymethyl group attached to the aromatic nucleus are heated with resin acids or esters of resin acids, a reaction takes place in which the acid corresponding to the acyl radical of the acyloxymethyl group is evolved. When the free resin acid employed is unsaturated, the condensation apparently follows two courses simultaneously. Part of the resin acid reacts at the carboxyl group, thus replacing the acyl radical of the acyloxymethyl group by the acyl radical of the resin acid. The remainder of the resin acid reacts at the double bonds, particularly if the acid contains a system of conjugated double bonds and thus forms a new resin of high acid number. That the reaction takes place, at least in part, in this manner is evidenced by the reaction of esters of the unsaturated resin acids and the acyloxymethyl derivatives of the esterified phenol. In such cases the acid corresponding to the acyl radical of the acyloxymethyl group is evolved but the esterified carboxyl group of the initial resin acid remains intact. Thus, resins of very low acid number can be prepared.

The reaction may be illustrated as follows—

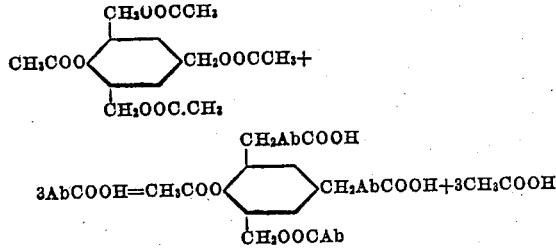

Ab=abietic nucleus.

Thus, when abietic acid reacts with 2,4,6-tris-(acetoxymethyl)-phenyl acetate, three mols of acetic acid are eliminated and replaced by three mols of the abietic acid, some of which reacts at the double bonds and the rest at the carboxyl group. The product is a hard resin having a high melting point. It may be esterified with a polyhydric alcohol such as glycerol or glycol to yield resins and may be used in conjunction with other polybasic acids in the production of alkyd resins. To these monobasic acids may be added, if desired. When methyl abietate is used in place of the abietic acid in the above reaction, a trimethyl ester of the formula

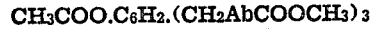

$$CH_3COO.C_6H_2.(CH_2AbCOOCH_3)_3$$

is obtained.

The acids which may be employed in this process are obtained from natural resins such as rosin, shellac, the copals, dammar, etc., examples of which are abietic, pimaric, sapietic, cativic, dehydroabietic, and dihydroabietic acids. The esters of these acids may also be used.

The properties of the resins obtained by this process may be varied by replacing part of the resin acid by the acids of a drying, semi-drying, or non-drying oil. For example, when one mol of 2,4,6-tris-(acetoxymethyl)-phenyl acetate is condensed with one mol of abietic acid and two mols of linseed oil fatty acids, a varnish base is obtained which contains no fatty glyceride and which dries rapidly to a hard film.

Rosin and other natural resin acids may also be hardened with acyloxymethyl derivatives of naphthol esters, or of hydroxy diphenyl esters by this process. Thus, any of these acids may be condensed with 1-acetoxymethyl-2-acetoxynaphthalene or 3-acetoxy-methyl-4-acetoxydiphenyl to yield acidic resins which resemble the natural fossil gums.

The aromatic nucleus of the esterified phenol may be mono- or polycyclic and in the latter case may be condensed ring system or separate rings joined by a carbon, sulfur, or oxygen bridge. The aromatic nucleus may also have other substituents such as alkyl, aryl, aralkyl, cycloalkyl, alkoxy and carboxy radicals or halogen atoms. The acyl radical of the acyloxymethyl group is derived from a monobasic acid, preferably an aliphatic acid having less than eight carbon atoms. The acyloxy radical which is attached directly to the nucleus may be monobasic or polybasic. In the latter case all of the carboxyl groups of the acid are esterified by the phenol. The preferred compounds are those in which the aromatic nucleus is selected from the benzene, diphenyl or naphthalene series having one or more esterified phenolic hydroxyl groups.

The following compounds are typical of those which may be employed according to the invention.

2,4,6,-tris-(acetoxymethyl)-phenyl acetate

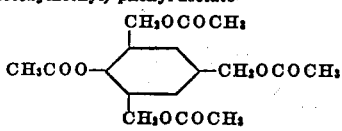

2,4,6-tris-(acetoxymethyl)-m-cresyl acetate

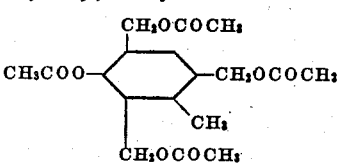

3-(acetoxymethyl)-4,4'-bis-(acetoxy)-diphenyl dimethyl methane

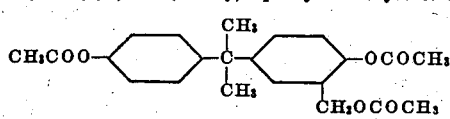

2,5-bis (acetoxymethyl)-1,4-diacetoxybenzene

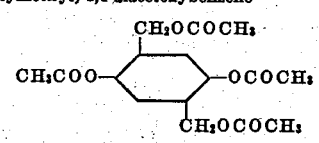

3-(acetoxymethyl)-4-acetoxydiphenyl

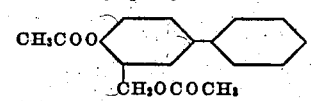

1-(acetoxymethyl)-2-acetoxy-naphthalene

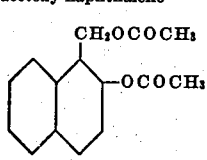

3,5-bis-(acetoxymethyl)-4-acetoxyphenyl isobutane

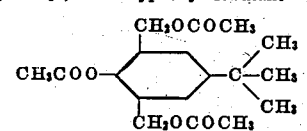

Bis-(2,2'-acetoxymethylphenyl)-succinate

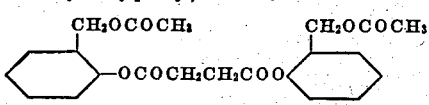

2-acetoxymethyl-phenyl stearate

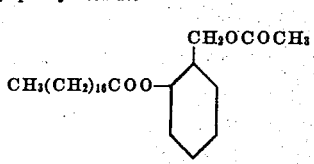

Bis-(2,2'-acetoxymethylphenyl)-phthalate

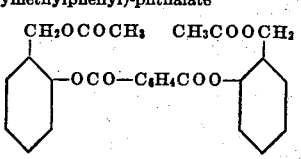

2-acetoxymethyl-phenyl oleate

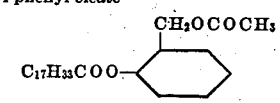

2,6-bis-(benzoyloxymethyl)-p-cresyl benzoate

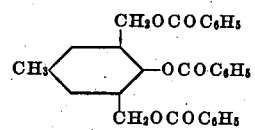

2,6-bis,(acetoxymethyl)-4-benzyl-phenyl acetate

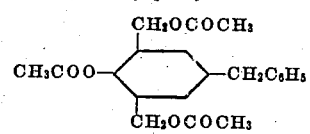

2-propionyloxymethyl-phenyl crotonate

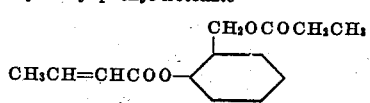

3, 5, 3', 5'-tetra-(acetoxymethyl)-4,4'-bis-(acetoxy)-diphenyl dimethyl methane

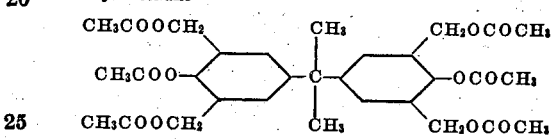

3-(acetoxymethyl)-4,4'-bis-acetoxy-benzophenone

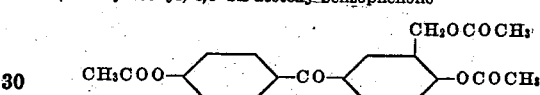

3-(acetoxymethyl)-4,4'-bis-acetoxy diphenyl sulfone

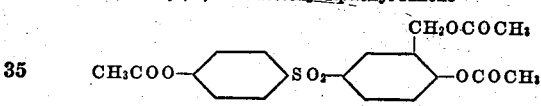

3-(acetoxymethyl)-4,4'-bis-acetoxy-diphenyl cyclohexane

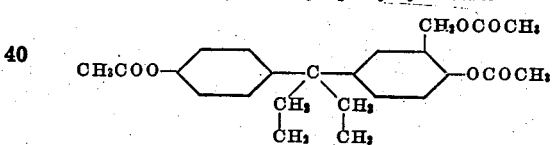

3,5-bis-(acetoxymethyl)-4-acetoxy-butyl-benzoate

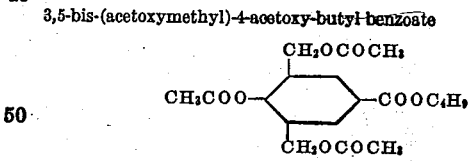

The reaction is carried out in general by heating a mixture of a compound of the above type with a resin acid or a resin acid ester to temperatures of 200–300° C., preferably 240–285° C. Depending on the molecular ratio of the reactants part or all of the acyl radical of the acyloxymethyl groups may be replaced by the resin acid or the ester. The reaction may be carried out at ordinary, reduced or superatmospheric pressures. Small amounts of metal oxides, hydroxides, or alkoxides of the alkali metals, alkaline earth metals, or heavy metals act as accelerators in the condensation as do also the halides of the amphoteric metals; for example, small amounts (0.5–1.0%) of sodium ethylate, zinc oxide, litharge or zinc chloride cause the condensation to proceed more rapidly at a lower temperature, 175–200° C.

The invention may be illustrated by the following examples—

*Example 1.*—A mixture of 90.6 grams (0.3 mol) of crystalline abietic acid (acid No. 185) and 35.2 grams (0.1 mol) of 2,4,6-tris-(acetoxymethyl)-phenyl acetate is heated for two hours at 250–260° during which time 18 cc. of acetic acid is evolved. The product is a hard, brittle, pale resin melting at 140–145° C. The acid number is 120 and the saponification number 168. It is soluble in toluene but not in varnish-maker's naphtha. On prolonged heating at 250–260° C. it becomes infusible and insoluble in organic solvents.

*Example 2.*—A mixture of 360 grams of gum rosin (M. P. 65° C., acid No. 162) and 108 grams of 2,4,6-tris-(acetoxymethyl)-phenyl acetate is heated for three hours at 250–255° C. until no more acetic acid is evolved. The product is a pale amber-colored resin having a melting point of 133–137° C. and an acid number of 118. It is soluble in varnish-maker's naphtha and in warm linseed oil. When cooked with linseed oil or tung oil, it yields fast drying varnishes.

By using "Galex" rosin, which is a mixture of dehydroabietic, dihydroabietic and tetrahydroabietic acids having a melting point of 62° C., in place of gum rosin, a resin having a melting point of 88–89° C. is obtained.

*Example 3.*—A mixture of 90 grams of vacuum distilled cativic acid and 27 grams of 2,4,6-tris-(acetoxymethyl)-phenyl acetate is heated for five and one-half hours at 250–255° C. until the evolution of acetic acid ceases. The product is a slightly sticky resin which is soluble in petroleum naphtha.

*Example 4.*—A mixture of 379.2 grams (1.2 mols) of methyl abietate and 140.8 grams (0.4 mol) of 2,4,6-tris-(acetoxymethyl)-phenyl acetate is heated for six hours at 250–260° C. during which time 69 grams of acetic acid (theory 72 g.) is evolved. The product is a brittle, pale amber-colored resin having an acid number of 2.0. It is readily soluble in aromatic and aliphatic hydrocarbons and in drying oils. When ethyl abietate is substituted for the methyl abietate, a somewhat softer resin of low acid number is obtained.

*Example 5.*—A mixture of 360 grams of ester gum (rosin glyceride, M. P. 80° C., acid No. 11) and 72 grams of 2,4,6-tris-(acetoxymethyl)-phenyl acetate is heated at 250–255° C. until the evolution of acetic acid ceases. The resulting product has a melting point of 128° C. and an acid number of 14. It is readily soluble in varnish-maker's naphtha and in linseed oil and may be used in the preparation of oleoresinous varnishes.

*Example 6.*—A mixture of 45.2 grams of ester gum, 35.2 grams of 2,4,6-tris-(acetoxymethyl)-phenyl acetate and 70 grams of linseed oil is heated at 250–260° C. for two hours during which time 8 cc. of acetic acid is evolved. The product is a very viscous mass. When this product is thinned with naphtha and a siccative added according to the usual varnish making practice, a fast drying, pale varnish is obtained.

*Example 7.*—A mixture of 69.2 grams (0.2 mol) of rosin (acid No. 162,) (M. P. 65° C.) and 56.8 grams (0.2 mol) of 3-(acetoxymethyl)-4-acetoxydiphenyl is heated at 250–260° C. until 17 cc. of acetic acid is evolved which requires about two and a half hours. The product is a pale amber-colored resin melting at 128–135° C. and having an acid number of 34.7. It is soluble in varnish-maker's naphtha and in drying oils and can be employed in the manufacture of oleoresinous varnishes.

*Example 8.*—A mixture of 34.6 grams of rosin (0.1 mol) and 25.8 grams (0.1 mol) of 1-(acetoxymethyl)-2-acetoxy naphthalene is heated at 255–265° C. for six and one-half hours during which time 10 cc. of acetic acid is evolved. The product is an amber-colored resin melting at 134–144° C. and having an acid number of 25.2. It is soluble in varnish-maker's naphtha and in linseed oil and can be used in the preparation of oleoresinous varnishes.

*Example 9.*—A mixture of 38 grams of 3,5-di-(acetoxymethyl) - 4 - (acetoxy) - butyl benzoate (0.1 mol) and 69.2 grams of rosin (0.2 mol) (M. P. 65° C.) is heated for one hour at 250–258° C. during which time 15 cc. of acetic acid is evolved. The product is a hard, pale yellow resin melting at 122–132° C. and having an acid number of 78.9. It is soluble in linseed oil.

I claim:

1. The process which comprises heating to reacting temperatures a mixture of an esterified phenol having at least one acyloxymethyl group attached to the aromatic nucleus and a member of the group consisting of natural resin acids and esters of natural resin acids.

2. The process which comprises heating to reacting temperatures a mixture of an esterified phenol having at least one acyloxymethyl group attached to the aromatic nucleus, said acyl group containing less than eight carbon atoms, and a member of the group consisting of natural resin acids and esters of natural resin acids.

3. The process which comprises heating to reacting temperatures a mixture of an esterified phenol having at least one acyloxymethyl group attached to the aromatic nucleus, said acyl group containing less than eight carbon atoms, a member of the group consisting of natural resin acids and esters of natural resin acids, and a member of the group consisting of drying oils and drying oil fatty acids.

4. The process which comprises heating to reacting temperatures a mixture of an esterified phenol having at least one acetoxymethyl group attached to the aromatic nucleus and a member of the group consisting of natural resin acids and esters of natural resin acids.

5. The process which comprises heating to reacting temperatures a mixture of an esterified phenol having at least one acyloxymethyl group attached to the aromatic nucleus and rosin.

6. The process which comprises heating to reacting temperatures a mixture of an esterified phenol having at least one acyloxymethyl group attached to the aromatic nucleus and a rosin ester.

7. The process which comprises heating to reacting temperatures a mixture of an esterified phenol having at least one acyloxymethyl group attached to the aromatic nucleus and a rosin glyceride.

8. The process which comprises heating to reacting temperatures a mixture of an esterified phenol having at least one acyloxymethyl group attached to the aromatic nucleus, a rosin glyceride, and a drying oil.

9. The process which comprises heating to 200–300° C. a mixture of 2,4,6-tris-(acetoxymethyl)-phenyl acetate and a member of the group consisting of natural resin acids and esters of natural resin acids.

10. The process which comprises heating to 200–300° C. a mixture of 2,4,6-tris-(acetoxymethyl)-phenyl acetate, a member of the group consisting of natural resin acids and esters of natural resin acids and a member of the group consisting of drying oils and drying oil fatty acids.

11. The process which comprises heating to 200-300° C. a mixture of 2,4,6-tris-(acetoxymethyl)-phenyl acetate and rosin.

12. The process which comprises heating to 200-300° C. a mixture of 2,4,6-tris-(acetoxymethyl)-phenyl acetate and a rosin ester.

13. The process which comprises heating to 200-300° C. a mixture of 2,4,6-tris-(acetoxymethyl)-phenyl acetate and a rosin glyceride.

14. The process which comprises heating to 200-300° C. a mixture of 2,4,6-tris-(acetoxymethyl)-phenyl acetate, a rosin glyceride and a drying oil.

15. The process which comprises heating to 200-300° C. a mixture of 2,4,6-tris-(acetoxymethyl)-phenyl acetate, a rosin glyceride and linseed oil.

16. A composition of matter resulting from the condensation of an esterified phenol having at least one acetoxymethyl group attached to the aromatic nucleus and a member of the group consisting of natural resin acids and esters of natural resin acids.

17. A composition of matter resulting from the condensation of an esterified phenol having at least one acyloxymethyl group attached to the aromatic nucleus, said acyl group containing less than eight carbon atoms, and a member of the group consisting of natural resin acids and esters of natural resin acids.

18. A composition of matter resulting from the condensation of an esterified phenol having at least one acyloxymethyl group attached to the aromatic nucleus, said acyl group containing less than eight carbon atoms, a member of the group consisting of natural resin acids and esters of natural resin acids, and a member of the group consisting of drying oils and drying oil fatty acids.

19. A composition of matter resulting from the condensation of an esterified phenol having at least one acyloxymethyl group attached to the aromatic nucleus and rosin.

20. A composition of matter resulting from the condensation of an esterified phenol having at least one acyloxymethyl group attached to the aromatic nucleus and a rosin ester.

21. A composition of matter resulting from the condensation of an esterified phenol having at least one acyloxymethyl group attached to the aromatic nucleus and a rosin glyceride.

22. A composition of matter resulting from the condensation of an esterified phenol having at least one acyloxymethyl group attached to the aromatic nucleus, a rosin glyceride, and a drying oil.

23. A composition of matter resulting from the condensation of 2,4,6-tris-(acetoxymethyl)-phenyl acetate and a member of the group consisting of natural resin acids and esters of natural resin acids.

24. A composition of matter resulting from the condensation of 2,4,6-tris-(acetoxymethyl)-phenyl acetate, a member of the group consisting of natural resin acids and esters of natural resin acids and a member of the group consisting of drying oils and drying oil fatty acids.

25. A composition of matter resulting from the condensation of 2,4,6-tris-(acetoxymethyl)-phenyl acetate and rosin.

26. A composition of matter resulting from the condensation of 2,4,6-tris-(acetoxymethyl)-phenyl acetate and a rosin ester.

27. A composition of matter resulting from the condensation of 2,4,6-tris-(acetoxymethyl)-phenyl acetate and a rosin glyceride.

28. A composition of matter resulting from the condensation of 2,4,6-tris-(acetoxymethyl)-phenyl acetate, a rosin glyceride and a drying oil.

29. A composition of matter resulting from the condensation of 2,4,6-tris-(acetoxymethyl)-phenyl acetate, a rosin glyceride and linseed oil.

HERMAN A. BRUSON.